March 21, 1933.   J. F. KING   1,902,244
EGG CANDLING MACHINE
Filed March 11, 1932   3 Sheets-Sheet 1

INVENTOR
JOSEPH F. KING
BY
ATTORNEY

INVENTOR
JOSEPH F. KING
BY
ATTORNEY

March 21, 1933.　　　　　J. F. KING　　　　　1,902,244
EGG CANDLING MACHINE
Filed March 11, 1932　　　　3 Sheets-Sheet 3
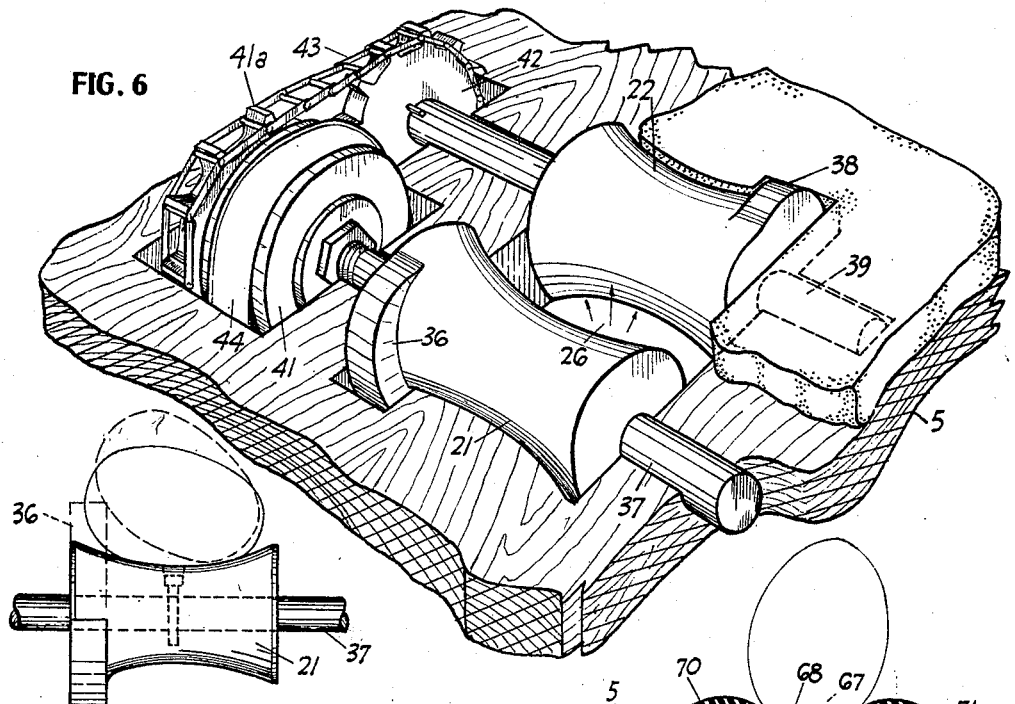
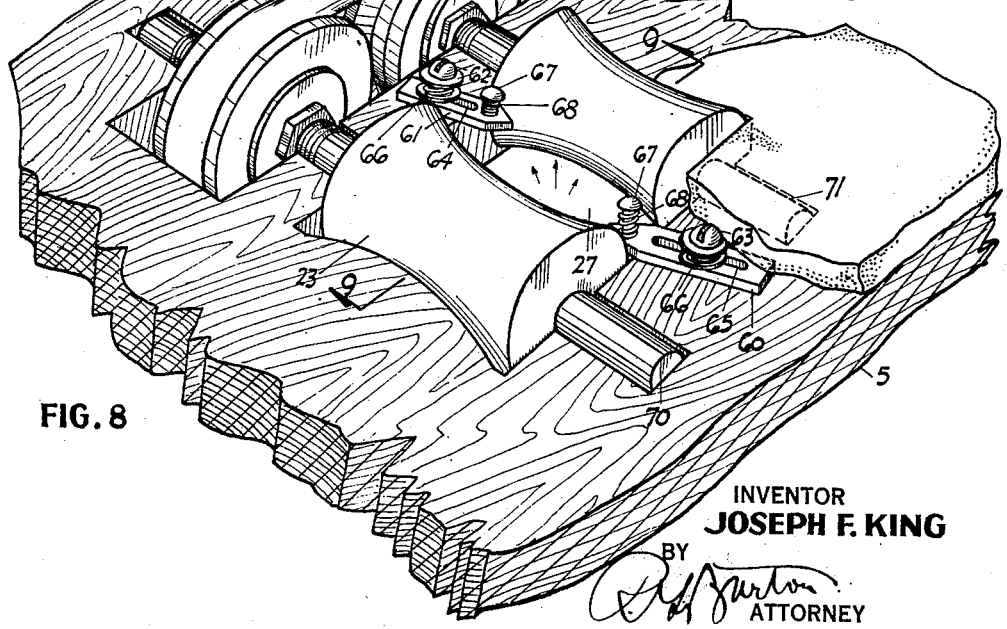
INVENTOR
JOSEPH F. KING
BY
ATTORNEY Patented Mar. 21, 1933

1,902,244

UNITED STATES PATENT OFFICE

JOSEPH F. KING, OF BURBANK, CALIFORNIA, ASSIGNOR OF ONE-HALF TO LEO C. KING, OF GLENDALE, CALIFORNIA

EGG CANDLING MACHINE

Application filed March 11, 1932. Serial No. 598,102.

My invention relates to the art of candling eggs.

It is the purpose of the invention to provide an improved method and means whereby the candling of eggs may be carried on in a far more expeditious manner than is possible with kindred devices now in use.

It is an important aim of the invention to provide improved means to impart to a rollingly supported egg a rotational tilting of the axis of the egg simultaneously with the rotation of the egg about its axis. This movement of the egg enables the attendant to study the structure of the egg from various positions while it is being rotated and thereby enabling the candler to make a more careful analysis of the existing conditions of the related parts of the egg in order to recognize the predominating characteristics of the egg in order that he may place the egg in its proper grade.

It is a particular object of the invention to devise a machine which will assist the operator to more clearly determine the existence of blood spots or other mis-colorings or defects in the eggs which are usually prevalent where flocks of hens are forced to lay excessively by reason of being fed certain rich egg producing mashes.

A still further aim of the invention is to improve in general upon the equipage and mechanical parts making up the assembly whereby a simple, durable, efficient and reasonably priced machine is provided.

The invention has still further features and advantages which will become apparent as the invention is unfolded.

In the accompanying drawings is shown an embodiment of the invention as now preferred.

Fig. 6 is an enlarged fragmentary perspective view of the eccentric rotary spools and driving mechanism.

Fig. 7 is a fragmentary view diagrammatically illustrating the manner in which the desired compound movement is given to the egg.

Fig. 8 is an enlarged fragmentary perspective view of the rotary spools and their driving mechanism, in combination with independent means to produce a wabbling movement of the egg as it is rotated.

Fig. 9 is a fragmentary section taken on line 9—9 of Fig. 8, diagrammatically showing how, by the use of wabblers, the egg may be rolled end over end.

Figure 1:
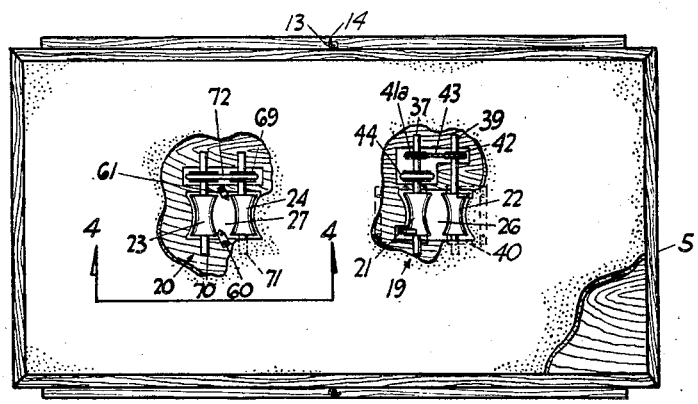
Fig. 1 is a plan view of the device, some parts of which are shown in section.
Figure 2:
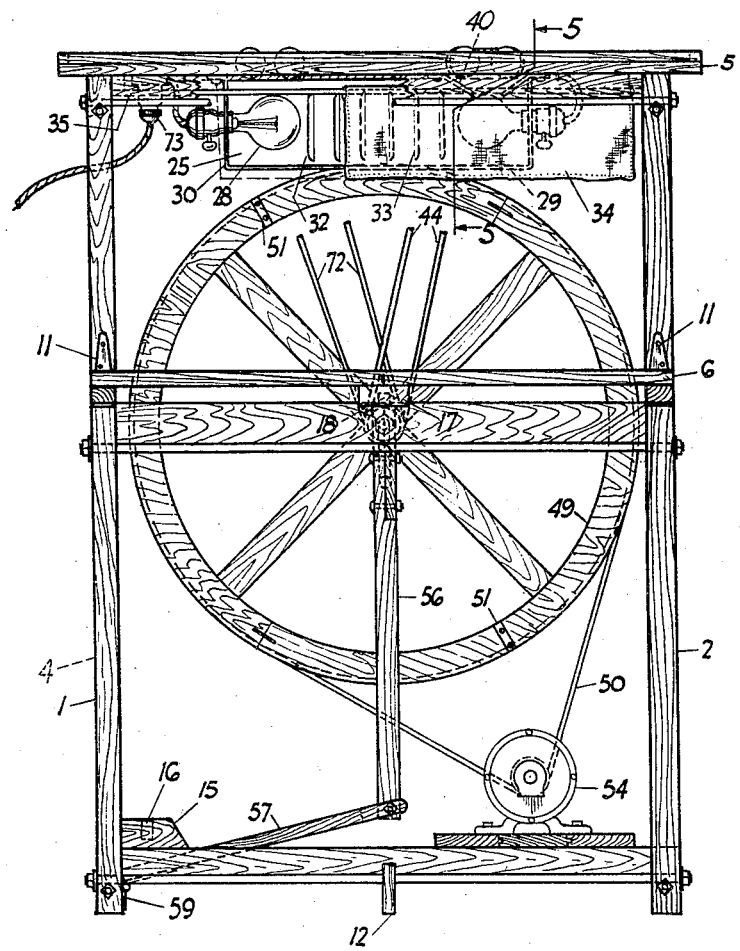
Fig. 2 is a side elevation of the device, some parts of which are shown in section and some are broken away to disclose interior construction.

Eggs, when subjected to light for the purpose of candling them, are usually handled either manually or by mechanical devices in order to successively bring the eggs to be examined into the proper position for candling.

Whether handled manually or by mechanical means, in present day methods disadvantages arise and the judging of the condition of the egg in the shell is likely to result in error.

In candling my hand the fingers come in contact with the shell of the egg, so that blemishes such as mold spots will be obscured from view. If the eggs are not completely turned before the candle, bad eggs, such as those containing mold spots or yolks which stick to the shell may not be detected. That is to say, one side of an egg may appear good on an incomplete candling but the other side may be found to be bad when brought into view.

In candling by present day machines, disadvantages also arise from the fact that the ends of the eggs are rarely if ever properly subjected to light. For this reason the most useful asset in judging the freshness of an egg is lost, since from the end of the egg the first imperfections arise. In such machines the egg is either supported at one end in a poised position, or it is suspended between supports at either end. Whenever it is supported rollingly at its sides, the light is usually blocked out at the ends in order to more fully project the light upwardly through the central portion of the egg.

When the egg is poised on one end, the character of the air space and the imperfections of freshness cannot be determined. Moreover the elasticity and tenacity of the chalazæ cannot be studied.

The yolk of an egg is contained in a sac, the membrane of which is of a delicate construction. In a fresh egg the yolk is slightly above the center in the large end of the egg and although the yolk is lighter than the white, it does not float against the shell because the chalazæ tend to hold it in a central position in the egg. The chalazæ are twisted, cord-like coils of opaque white material which extend from the yolk through the white toward each end of the egg.

In a fresh egg the yolk sways but little when the egg is set in motion and the white is so firm that the spherical form of the yolk is altered very little.

As the egg ages the yolk sac weakens and at the same time the white gets thinner. As the white weakens it makes possible for the yolk to float nearer the shell.

Since in candling an egg the size of the air space is useful in determining its freshness, and since as the egg ages the air space increases in size, it is highly important that that end of the egg be adapted for study as it is being candled in order to more accurately and quickly determine the paramount condition of the egg, that of freshness.

Furthermore, as the egg ages and shrinkage of the egg membrane continues it pulls away from the shell membrane at the air space, so that when the egg is turned the lower wall of the air cell changes at the same time.

From the foregoing a knowledge will be gleaned of the fact that when candling an egg it is not only necessary to rotate the egg about its longitudinal axis, but a rollingly transverse movement thereof is beneficial in judging the freshness of an egg, and one is better enabled to judge more accurately of the condition at the end of the egg wherein the first imperfect conditions of the egg arise.

A study of the particular embodiment of the invention as shown in the drawings, now especially directed to the first three figures, discloses a frame consisting of four posts 1, 2, 3 and 4 of which the first three are visible, and a table-top or deck 5. There is also included in the frame longitudinal and transverse members to rigidify the structure, and there is further employed the use of tie rods to insure that the various parts are always satisfactorily held in place.

The frame is oblong and preferably constructed of wood, to afford lightness in handling and shipping, and is of a height which is suitable for an operator to be within convenient reach of a tray of eggs to enable him or her to take eggs therefrom, place them upon the deck, subject them to inspection and then transfer them to another receptacle which is also within reach wherein the eggs are placed after they have been candled.

Figure 3:
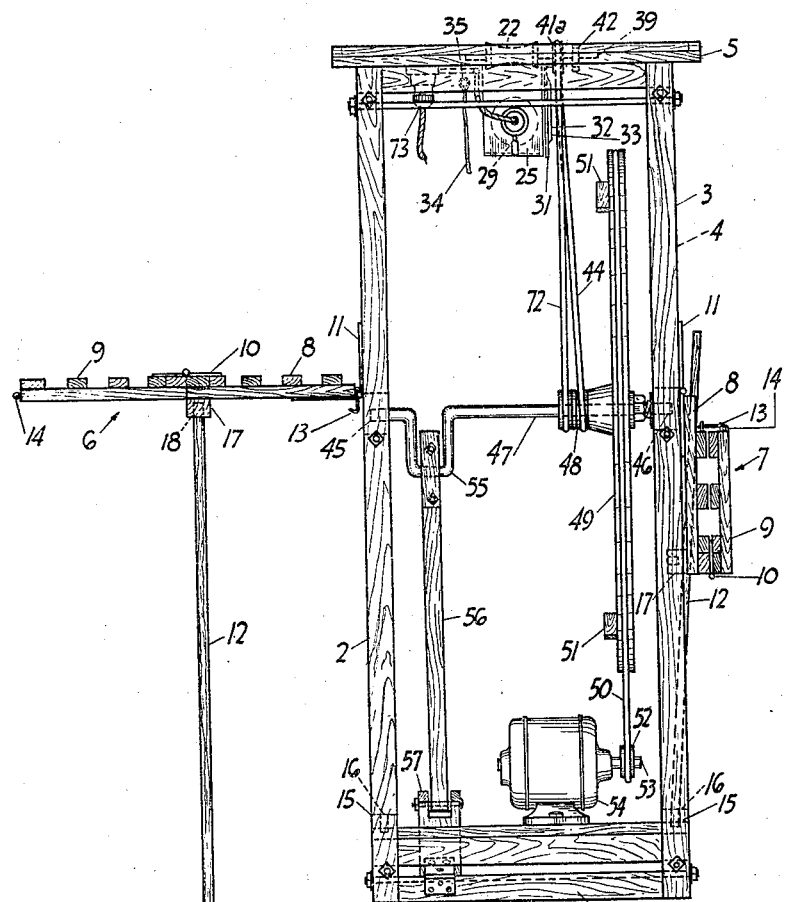
Fig. 3 is an end elevation of the machine showing the egg-supporting rack in operative position on one side and in inoperative position on the other side.
Figure 4:
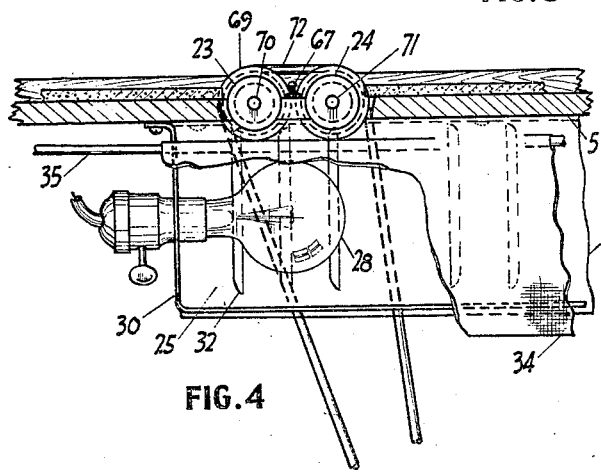
Fig. 4 is a fragmentary section on an increased scale taken on line 4—4 of Fig. 1.

For the purpose of placing the crates of uncandled and candled eggs within convenient reach of the candler, I employ the set of foldable racks 6 and 7 attached to the frame at its sides. In Fig. 3 the rack 6 is shown in operative position and the rack 7 is shown in inoperative position.

The racks comprise a foldable tray consisting of wooden slat members 8 and 9, with hinges 10 uniting the same; the member 8 of the tray being in turn hinged to the frame proper by hinges 11. I employ the use of a rack-post 12 to support the tray when in operative position, and a hook 13 and eye 14 to unite the member 8 with the member 9 in folded and inoperative position. I also employ a skew block 15 in the corner of the frame provided with a socket 16 wherein to house the rack-post 12 when not in use. To the underside of the member 8, I attach a block 17 and I provide a socket 18 in said block, into which I insert the rack-post when it is desired to use the tray for the purpose of supporting a crate.

In the deck 5 are installed dual egg candling units 19 and 20. The function of each unit is to produce a rolling and alternate endwise tilting of the egg or in other words, give to an egg what I call a "circumgyratory" movement. Said units are accessible to an operator or candler stationed at either end of the deck.

Although the construction of the two units differ in their mechanical detail, yet as stated supra, they perform equivalent functions and the description of one in this respect therefore suffices for both.

The unit 19 consists of two spools 21 and 22, and the unit 20 consists of two spools 23 and 24. All of said spools are preferably made of soft rubber and have a circumferentially concaved semi-smooth surface which resembles that of the curvature of an egg so that when an egg is placed in spanning position thereon, there will be gained sufficient tangential bearing between the surface of the spools and that of the egg to produce a rotation of the egg without slippage when the spools are rotated.

There is a light compartment 25 placed just beneath the spools as may be readily seen in Figs. 2, 3, 4 and 5 and there are provided openings 26 and 27 in the deck which communicate with said compartment through which rays from the lamps 28 and 29 are directed onto an egg when the egg is adjacently supported between the spools as diagrammatically shown in Figs. 7 and 9.

Figure 5:
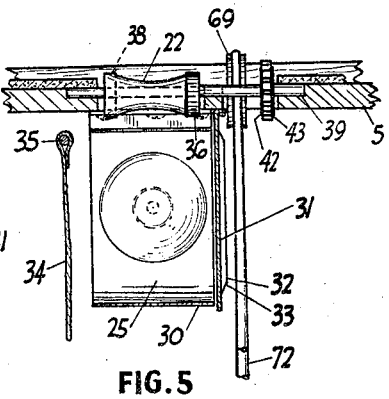
Fig. 5 is a fragmentary section on the same scale as Fig. 4, taken on line 5—5 of Fig. 2.

The bottom and end walls of the light compartment 25 are composed of a sheet metal band 30, which is constructed of a U-shape having flanged ends fastenable to the deck. The U-structure is of sufficient proportions to conveniently house the lamps 28 and 29 and enclose the openings 26 and 27. One of the sides of the U-structure thus formed is substantially closed by a draft shutter or metal shield 31 having oppositely disposed gill-slits 32 and 33. The other side of the U-structure is substantially closed by a canvas curtain 34 which is slidably mounted upon the rod 35. The curtain being slidably mounted affords easy access to the compartment when replacing or inspecting the lamps. Also, it being slidably positioned away from the compartment as seen in Fig. 5 permits of the dissipation of heat from the compartment, and especially when under the influence of a draft created through the gill-slits as will presently be described.

The method of candling eggs with unit 19 will be referred to as the "eccentric" method and the method of candling eggs with the unit 20 will be referred to as the "wabbler" method.

To obtain an endwise lifting of first one end of an egg and then the other, as it is being rotated by the eccentric method, I employ the use of a cam or eccentric mounted upon the end portions of each spool to expand the girth at these points. The spool 21 is provided with a cam 36 and is mounted upon a shaft 37. The spool 22 is provided with a cam 38 and is mounted upon a shaft 39, and the opening 26 is slotted at oppositely disposed corners to accommodate the excess in periphery of the spools as they pass at these points.

I also provide on the underside of the deck where these slots occur a metal shield 40 to prevent the emitting of light therethrough. The shafts 37 and 39 are journalled in cut-away portions of the deck 5. On the shaft 37 I mount a sprocket wheel 41a and a pulley 41 and on the shaft 39 I mount a sprocket wheel 42. The two sprocket wheels are of the same diameter and are connected by a drive chain 43 extending through an aperture in the deck whereby the spools 21 and 22 are rotated in unison at the same rate of speed. It is essential that the position of the two eccentrics be maintained the same distance apart, that position as now selected as the most advantageous is deemed to be 180 degrees apart with relation to each other. This arrangement gives an alternate elevating of the ends of the egg as it is being rotated.

Methods in use at the present time rotate the egg about its longitudinal axis only and the focus of the candler's eye is always directed along the longitudinal axis of the egg. By candling an egg using the old methods a comprehensive study of the egg structure is impossible. There are imperfections which occur, and unless a proper up and down movement of the egg is had, an erroneous grading of the egg may occur.

For example, the yolk of an egg is held in suspension by the chalazæ portion of the egg. When an egg becomes old or stale the white becomes thin, the air gaps increase in size, and the membrane enclosing the yolk becomes delicate. When such an egg is placed so as to rotate about its axis and then an endwise lifting is had, any imperfection with regard to the elasticity or tenacity of the chalazæ is more readily discernable and a more accurate candling results.

These conditions have been fully explained hereinbefore and need not be repeated now.

The pulley 41 is driven by a belt 44 of circular cross-section. The sprocket 41a which is keyed to the same shaft as the pulley 41, drives through the medium of the sprocket chain 43, the sprocket 42.

In the longitudinal members 45 and 46 I desirably journal a crank shaft 47, and on said shaft I mount a double grooved pulley 48 and a driven wheel 49. Said driven wheel is provided with a rim groove in which the belt 50 travels and fan blades 51 which will cause a draft through either set of the gill-slits 32 and 33 depending on the direction of rotation of the wheel 49 by the crank shaft.

The pulley 48 may be keyed to the crank shaft 47 or fastened to the hub of the wheel 49 or both.

The wheel 49 is rotated by means of the belt 50 connected to the pulley 52 mounted on the drive shaft 53 of the motor 54. The wheel 49 is made sufficiently large in diameter to reduce the speed of the motor so that the peripheral speed of the spools will be such that an egg resting therein will be rotated about its axis and up-ended several times in a short space of time in order to give the candler a good view of all parts of the shell and a correct observance of the contents of the egg within the shell. Note the diagrammatic dotted and full position of the egg in Fig. 7.

In order to manually drive the spools and in order to alternate the driving thereof, I provide the crank shaft 47 with a crank portion 55. To said crank portion I connect one end of a crank rod 56 and to the other end of said rod 56 I pivotally connect a treadle 57 hingedly fastened to the transverse member 58 by means of the hinge 59.

Several different methods can be employed in the revolving and tilting of the egg on the spools whereby other than a constant lengthwise rotation is obtained. One other such arrangement in addition to that just previously disclosed will now be described as an alternative construction. This as stated supra is by the use of "wabblers" and directed to Figs. 1, 4, 8 and 9 and with particular reference to the three latter figures mentioned.

In the alternate specie I employ the use of a pair of plain spools 23 and 24 similarly mounted in the deck 5 to those of spools 21 and 22.

I juxtapose between the spools 23 and 24 a pair of wabblers 60 and 61 which fasten to the deck 5, screws 62 and 63 serving to hold said wabblers to said deck. Each wabbler consists of a pointed piece of strap metal and is provided with a central longitudinal slot 64 and 65. The screws 62 and 63 are applied to the deck through the slots and a compression spring 66 of somewhat sensitive resiliency is interposed between the head of the screw and the wabbler to retain a fixed position of the wabbler.

Since the size of eggs vary, it has been deemed preferable to slot the wabblers and to mount them in a manner whereby a quick adjustment may be easily effected when different sizes of eggs are to be candled. Into the pointed end of each wabbler I loosely mount an oval head pin 67. The shank of the pin extends through the wabbler and is then burred and between the head of this pin and the wabbler I also interpose a soft coil spring 68. The sides of the egg when placed on the spools rollingly contact the contoured surface of the spools with the ends of the eggs touching the oval heads of the pins. The object of placing the springs beneath the oval heads is to forestall cracking the shell while the egg is being placed on the spools.

As the egg is rotated about its longitudinal axis there will be an alternate up-ending of the egg caused by the wabblers in a manner as taught by the diagrammatic view shown in Fig. 9

The rotation of the spools 23 and 24 need not be constant as was described in the case of spools 21 and 22. The rotation of spools 23 and 24 is effected by placing pulleys 69 on the shafts 70 and 71 and connecting said pulleys by a belt 72 running through the deck with the remaining groove in the pulley 48. The driving of the spools 23 and 24 is effected in like manner to that already explained with reference to the driving of spools 21 and 22.

Both of the egg candling methods as disclosed by the invention work with equal degree of satisfaction. Eggs can be candled on my improved machine very rapidly and thoroughly because of the fact that no part of the egg is hidden from view, as is the case when candling eggs by holding before a light with the fingers, and the eggs are revolved in a gentle manner and at a speed giving the operator ample time to detect any imperfection. Hence much time is saved because eggs are unpacked, candled and repacked all in one operation by only one person.

Breakage is reduced to a minimum because of the fact that the deck is covered with a soft spongy rubber pad, and spools and pulleys are also of rubber. There is practically no wear on any part of the machine of this character and with little care it will give satisfactory service for many years.

In the operation of the machine, the candler takes his or her station at either end of the machine. A full crate of eggs to be candled is placed on a tray on one side of the machine and an empty crate is placed on the other tray on the other side of the machine.

The operator next starts the machine by energizing the motor and connects the plug 73 to any convenient light source thereby energizing the lamps 28 and 29. From the full crate he detaches the paper packing from the upper layer of the eggs and places it in the empty crate, then with one hand he reaches for a loose egg from which he has removed the packing and places it on the revolving spools.

The eccentrics are so positioned that as the spool revolves on its axis one eccentric will just have completed the elevating of one end of the egg as the other eccentric starts elevating the other end of the egg. It has proven unfeasible to have the eccentrics arrive always at the proper time, when driving the spools with a belt, as there is always a tendency for the belt to creep or slip somewhat, thereby throwing the eccentric out of time.

While the circumgyratory movement is being given to the egg it can be thoroughly inspected and if no imperfections are noted he removes it with the other hand placing the egg and packing in the empty crate and repeats with another egg. In this manner, with dexterity, from six to ten crates of eggs can be thoroughly candled and graded per hour.

Where no power is available as is often the case in the country, a different lighting system may be substituted and the power treadle is made available in operating the machine.

The person operating the second unit of spools operates in the same manner as outlined supra. Each operator works independently of the other. When only one unit is so desired the other can be detached. Very little power is required to operate the machine and a very small motor is therefore sufficient.

In order to cause the egg to be repeatedly turned end over end, the wabbler arms 60 and 61 are adjusted as shown in Fig. 9 to point directly toward each other and parallel with the axes of shafts 70 and 71. But when said wabbler arms are adjusted to the positions shown in Fig. 8, that is to say at oppositely disposed angles with relation to the shafts 70 and 71, the ends of the eggs gyrate about the oval headed pins 67 yieldingly carried by the wabblers. The body portion of the egg then contacts with and is rotated by the concave peripheries of the spools 23 and 24 and the end portions of the egg contact with said pin heads in a practically frictionless manner, and are alternately caused to rise and fall.

I claim:

1. In a device of the kind described, a pair of spools, and means to impart to an egg supported between the adjacent surfaces of said spools a circumgyratory movement.

2. In a device of the kind described including a deck, means mounted in said deck to rollingly support an egg at its sides and means whereby the ends of the egg are alternately elevated during the rolling thereof.

3. In a device of the kind described, a pair of juxtaposed spools, means to rollingly support an egg thereon, and cam means mounted upon said spools to elevate an end of the egg during the rotation thereof.

4. In a device of the kind described, a deck, supporting means for the deck, a pair of juxtaposed spools including shafts journalled in said deck, means to rotate said spools and a cam on said spools whereby to tilt an egg endwise as the egg is rotated on said spools.

5. In a device of the kind described, rolling means to support an egg between the adjacent surfaces thereof, and means operatively related to said rolling means to effect a transverse movement of the egg during the rolling thereof.

6. In a device of the kind described, a deck, supporting means for the deck, a pair of spools including shafts journalled in said deck, said spools being provided with a longitudinally extending circumferential concavity a portion of which at one end is bulged to form a cam, and a compartment adjacent said deck having therein a source of light the rays of which are directed between said spools through an aperture in the deck.

7. In a device of the kind described, a pair of spools, means to impart to an egg supported between the adjacent surfaces of said spools a circumgyratory movement, in combination with a deck having an opening and a light compartment provided with a source of light positioned to shine through said opening onto the egg.

8. In a device of the kind described, a frame including a deck, egg supporting means carried by said deck, and driving means operatively related to said egg supporting means to effect an endwise tilting of said egg.

9. In a device of the kind described, egg supporting means, supporting means for said egg supporting means, and driving means for said egg supporting means whereby to effect an alternate endwise tilting of said egg.

10. In a device of the kind described, egg supporting means, supporting means for said egg supporting means, and driving means for said egg supporting means to simultaneously rotate and alternately elevate the ends of said egg.

11. In combination with a frame including a deck provided with an opening and a light tight compartment mounted adjacent said opening provided with a source of light adapted to shine through said opening, one of the sides of said compartment consisting of a draft shutter having oppositely disposed gill-slits and the other side consisting of a slidably mounted curtain in combination with adjustable egg supporting means mounted on said deck in said opening, means to impart to an egg supported by said egg supporting means a circumgyratory movement and means operatively related to said driving means to create a current of air through said gill-slits into said compartment.

12. In a device of the kind described, a frame including a deck, and adjustable egg wabblers mounted on said deck.

13. In a device of the kind described, the combination with a frame including a deck and means mounted in said deck to rollingly support an egg substantially about its longitudinal axis, of adjustable means cooperating with the first recited means to effect a wabbling of the egg as it is being rolled.

14. As an article of manufacture, a spool composed of rubber and provided with a longitudinally extending circumferential concavity, and a cam formed in one end of said spool to expand the girth thereof at that point, there being a longitudinal bore through the center of said spool.

15. As an article of manufacture, an egg-supporting spool having a rubber periphery and provided with a longitudinally extending circumferential concavity which, with relation to the axis of the spool, is curved to approximately the same extent as the longitudinal curvature of the shell of an average hen's egg, and a cam located in one end portion of said concavity, said cam being so shaped as to engage an egg supported by the spool during only a small portion of each rotation of the spool.

16. In a device of the kind described, the combination, with means to illuminate an egg; of a frame including a deck, a pair of rotatable spools mounted upon shafts journaled in said deck and positioned to support an egg between them, and an adjustable wabbler arm projecting between said spools at each side of the device to cause an alternate endwise tilting of the egg.

17. The subject matter of claim 16 and, each of said wabbler arms having an upstanding egg-engaging projection which is yieldingly supported by such arm.

JOSEPH F. KING.